UNITED STATES PATENT OFFICE.

ARTHUR AMOS NOYES AND ARTHUR AUSTIN CLEMENT, OF BOSTON, MASSACHUSETTS.

PROCESS FOR THE MANUFACTURE OF PARAAMIDOPHENOL SULPHONIC ACID.

SPECIFICATION forming part of Letters Patent No. 511,450, dated December 26, 1893.

Application filed March 16, 1893. Serial No. 466,318. (No specimens.)

*To all whom it may concern:*

Be it known that we, ARTHUR AMOS NOYES and ARTHUR AUSTIN CLEMENT, citizens of the United States, residing at Boston, in the county of Suffolk, in the State of Massachusetts, have discovered a new and useful Process for the Manufacture of Paraamidophenol Sulphonic Acid; and we do hereby declare that the following is a full, clear, and exact description of the discovery, which will enable others skilled in the art to which it appertains to use the same.

Para-amido-phenol which has a commercial value by reason of its use in photography and in the manufacture of dye-stuffs, can be obtained by heating the above mentioned sulphonic acid to a high temperature with hydrochloric or sulphuric acid. Hitherto para-amido-phenol has commonly been prepared by the action of reducing agents on para-nitro-phenol. The essential feature of our discovery is that para-amido-phenol-sulphonic acid can be made by electrolyzing a sulphuric acid solution of nitro-benzol.

The following is a detailed description of the process:—One part by weight of nitro-benzol is dissolved in four parts of concentrated sulphuric acid; and this solution is submitted to electrolysis. Platinum is used for the positive electrode and cast iron for the negative electrode; the positive electrode is placed within a porous cup, which is nearly filled with concentrated sulphuric acid. This cup and the negative electrode are placed in the vessel containing the sulphuric acid solution of the nitrobenzol, the purpose of the porous cup being to protect the reduction products of the nitro-benzol from the action of the oxygen set free at the positive electrode. An electric current of such strength is passed through the solution that its temperature is maintained at 90° to 100° centigrade without application of external heat, and the action of the current is continued until a portion of the solution no longer precipitates an oil (unchanged nitro-benzol) on dilution with water. After the electrolysis is completed, water is added to the product and the liquid is filtered. The solid collected on the filter is washed with water and treated with a solution of caustic soda or other alkali, by which operation the para-amido-phenol-sulphonic acid is dissolved out as a sodium salt. The sulphonic acid itself is precipitated from this solution by neutralizing with hydrochloric acid; it is then washed with water, and dried; or, if desired, it can be further purified by dissolving it again in alkali and reprecipitating it with acid.

Having fully described our discovery, what we claim, and desire to secure by Letters Patent, is—

The above described process of manufacturing para-amido-phenol-sulphonic acid by the electrolysis of a strong sulphuric acid solution of nitro-benzol.

ARTHUR AMOS NOYES.
ARTHUR AUSTIN CLEMENT.

Witnesses:
W. R. WHITNEY,
W. S. DAVENPORT.